W. A. PHIPPS.
COTTON PICKER.
APPLICATION FILED JUNE 26, 1908. RENEWED OCT. 8, 1909.
940,274.
Patented Nov. 16, 1909.
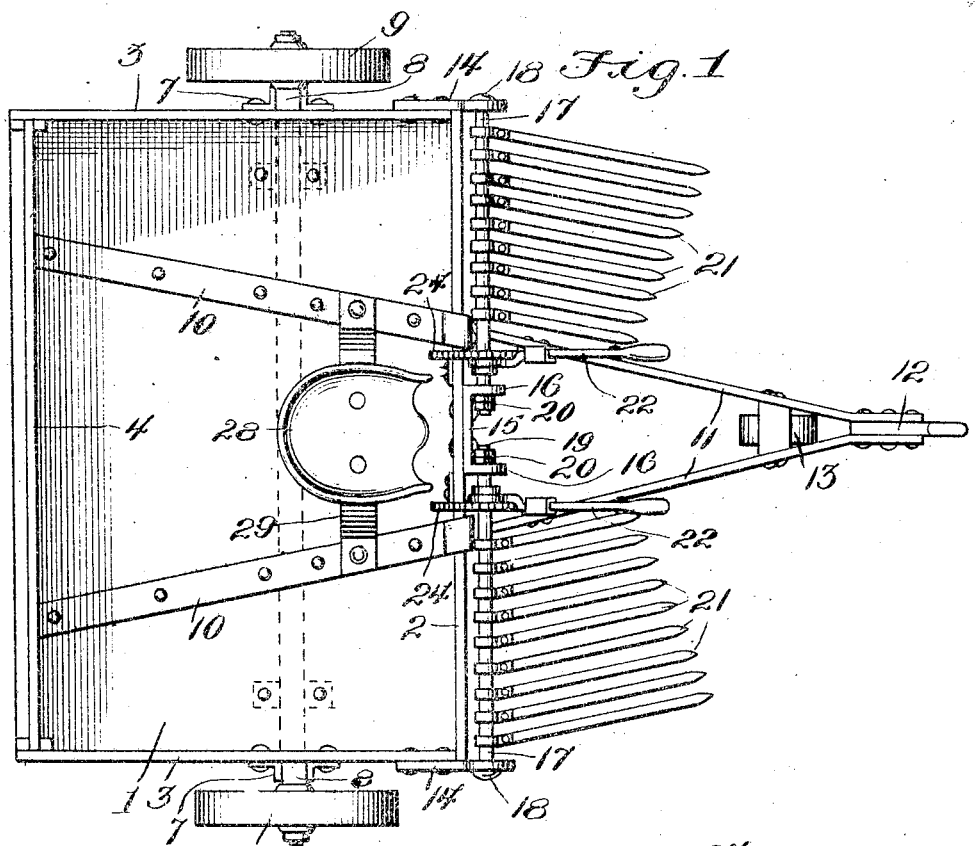
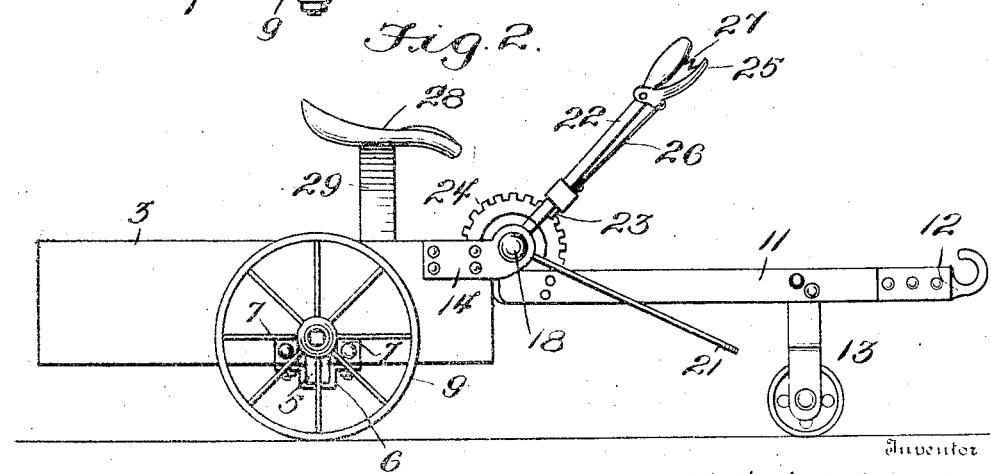
Witnesses
J. L. Wright,
John F. Byrns.
Inventor
Willis A. Phipps
By Victor J. Evans,
Attorney

UNITED STATES PATENT OFFICE.

WILLIS A. PHIPPS, OF FAY, OKLAHOMA.

COTTON-PICKER.

940,274. Specification of Letters Patent. Patented Nov. 16, 1909.

Application filed June 26, 1908, Serial No. 440,584. Renewed October 8, 1909. Serial No. 521,751.

*To all whom it may concern:*

Be it known that I, WILLIS A. PHIPPS, a citizen of the United States, residing at Fay, in the county of Dewey and State of Oklahoma, have invented new and useful Improvements in Cotton-Pickers, of which the following is a specification.

My invention relates to improvements in cotton pickers, and the primary object of the invention is the provision of a cotton picker which comprises a receptacle and sets of relatively spaced fingers carried by the receptacle, the picker fingers being adapted to remove the bolls from the plants and discharge them into the receptacle.

A further object of the invention is the provision of a cotton picker wherein the sets of picker fingers may be independently adjusted to compensate for plants of different heights.

A still further object of the invention is the provision of a cotton picker which is simple, durable and efficient and which can be manufactured and sold at a comparatively low cost.

With the above and other objects in view the invention consists in the construction, combination and arrangement of parts hereinafter fully described and claimed, and illustrated in the accompanying drawings, wherein—

Figure 1 is a top plan view of a cotton picker constructed in accordance with my invention, and Fig. 2 is a view in side elevation thereof.

The receptacle of my improved cotton picker comprises a bottom 1, front 2, sides 3 and end gate 4. An axle 5 is secured to the under side of the bottom 1 of the receptacle by means of clips 6, and the ends thereof are bent upwardly and then laterally. The upwardly bent portions of the axle are connected to the sides 3 of the receptacle through the medium of attaching elements 7, and the laterally bent portions form pintles 8 upon which wheels 9 are journaled. Bars 10 are secured to the upper side of the bottom 1 of the receptacle and are inclined upon each other in the direction of the longitudinal axis of the receptacle, the bars adding strength and rigidity to the bottom of the receptacle. The bars 10 project beyond the front of the receptacle to provide draft bars 11 which are inclined upon each other in the direction of the longitudinal axis of the receptacle. A clevis 12 is secured to and between the front ends of the draft bars 11. The front ends of the draft bars are supported by a caster wheel 13.

Brackets 14 are secured to the sides 3 of the receptacle and project beyond the front 2 thereof, and a bracket 15 which includes a pair of relatively spaced ears 16 is secured to the front 2 at a point centrally between the brackets 14. The projecting ends of the brackets 14 and the ears 16 of the bracket 15 are provided with horizontally alined bearing openings in which a pair of shafts 17—17 are journaled. Each shaft 17 comprises a head 18 and a threaded end 19. The shafts 17 and 17 are secured in the bearings against accidental displacement by means of their heads 18 and nuts 20 which are mounted on their threaded ends. Each shaft 17 is provided with a set of relatively spaced picker fingers 21 which project forwardly and downwardly therefrom and which are inclined in the direction of the longitudinal axis of the picker. The picker fingers are rigidly secured to the shaft 17. The picker fingers of each set gradually increase in length outwardly from the innermost finger whereby they will during the movement of the machine progressively enter the cotton plants. As the picker fingers 21 progressively enter the cotton plants the resistance offered to the draft of the machine is reduced to the minimum. As the picker fingers are inclined in the direction of the longitudinal axis of the machine, the plants are spread whereby to facilitate the removal of the bolls therefrom by the fingers. The bolls are discharged from the picker fingers into the receptacle. Levers 22 are secured at their lower ends to the shafts 17 and 17, and provide means by which the downward inclination of the picker fingers may be changed so as to compensate for cotton plants of different heights. The levers 22 are provided with dogs 23 which are designed for engagement with the teeth of arcuate racks 24. Hand levers 25 are pivotally mounted upon the levers 22 and are connected to the dogs 23 through the medium of rods 26, said hand levers providing means by which the dogs may be withdrawn from engagement with the racks when it is desired to change the downward inclination of the picker fingers. Springs 27 are interposed between the levers 22 and the levers 25, said springs being adapted to normally retain the dogs 23 in engagement with the racks 24. The racks 24 are secured at their ends to the draft bars 11 and to the front 2 of the receptacle. The levers 22 are within convenient reach of the occupant of the seat 28 which is carried by an arcuate support 29. The support 29 is secured at its ends to the bars 10.

It should be apparent from the above description, taken in connection with the accompanying drawings, that I provide a cotton picker in the use of which the bolls may be removed from two rows of plants on each passage of the picker over a field, and that the bolls will be deposited into the receptacle of the picker. As the downward inclination of the picker fingers may be changed the picker may be successfully used on a field containing plants of different heights. It should also be apparent that the cotton picker is simple in construction and may be manufactured and sold at a comparatively low cost.

Changes in the form, proportions and minor details of construction may be made within the scope of the claims without departing from the spirit or sacrificing any of the advantages of the invention.

Having thus described the invention, what I claim as new is:—

1. A cotton picker comprising a wheeled receptacle, a draft means secured to the receptacle, and a set of relatively spaced picker fingers secured to the receptacle, the fingers being of relatively different lengths and inclined inwardly in the direction of the longitudinal axis of the picker.

2. A cotton picker comprising a wheeled receptacle, a draft means secured to the receptacle, sets of relatively spaced picker fingers secured to the receptacle, the picker fingers being inclined inwardly in the direction of the longitudinal axis of the picker.

In testimony whereof I affix my signature in presence of two witnesses.

WILLIS A. PHIPPS.

Witnesses:
I. U. SMITH,
HAROLD W. SMITH.